United States Patent
Sirkka et al.

(10) Patent No.: US 11,166,294 B2
(45) Date of Patent: Nov. 2, 2021

(54) SCHEDULING IN REPETITIVE RF ENVIRONMENTS

(71) Applicant: QUALCOMM Incorporated, San Diego, CA (US)

(72) Inventors: Juha Sirkka, San Diego, CA (US); Christophe Chevallier, San Diego, CA (US); Hetal Pathak, San Diego, CA (US); Onur Senel, San Diego, CA (US); Saravanan Balasubramani, San Diego, CA (US); Neil Carlson, San Diego, CA (US); Leonid Golovanevsky, La Jolla, CA (US); John David Boyd, San Diego, CA (US); Tawfik Benabdeljalil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 49 days.

(21) Appl. No.: 16/270,998

(22) Filed: Feb. 8, 2019

(65) Prior Publication Data

US 2020/0260469 A1 Aug. 13, 2020

(51) Int. Cl.
*H04W 72/08* (2009.01)
*H04W 72/12* (2009.01)
*H04W 24/08* (2009.01)
*H04W 4/70* (2018.01)

(52) U.S. Cl.
CPC ....... *H04W 72/1231* (2013.01); *H04W 24/08* (2013.01); *H04W 4/70* (2018.02); *H04W 72/08* (2013.01)

(58) Field of Classification Search
CPC .... H04W 72/1231; H04W 24/08; H04W 4/70
See application file for complete search history.

(56) References Cited

U.S. PATENT DOCUMENTS

| | | | |
|---|---|---|---|
| 10,667,153 B2* | 5/2020 | Kim | H04W 24/08 |
| 2008/0259846 A1* | 10/2008 | Gonikberg | H04W 72/1215 370/328 |
| 2008/0298380 A1* | 12/2008 | Rittmeyer | H04L 47/245 370/412 |
| 2012/0236736 A1 | 9/2012 | Frank et al. | |
| 2013/0090127 A1 | 4/2013 | Nishikawa et al. | |

(Continued)

OTHER PUBLICATIONS

International Search Report and Written Opinion—PCT/US2020/017306—ISA/EPO—dated May 7, 2020.

*Primary Examiner* — Thinh D Tran
(74) *Attorney, Agent, or Firm* — Procopio, Cory, Hargreaves & Savitch LLP

(57) ABSTRACT

Many environments or operational conditions create repetitive radio frequency (RF) interference conditions resulting from repetitive mechanical or electrical activity. This activity may create oscillations in the RF conditions between an MTC UE and a serving base station. Aspects of the present invention are directed to improving data efficiency and battery life by optimizing communication based on a detected periodicity of repetitive mechanical or electrical activity at the UE by monitoring the oscillations of at least one RF condition between the MTC UE and the base station, and scheduling communication between the UE and the network during periods associated with favorable radio conditions.

32 Claims, 8 Drawing Sheets

(56) References Cited

U.S. PATENT DOCUMENTS

| | | |
|---|---|---|
| 2014/0029526 A1 | 1/2014 | Friday et al. |
| 2016/0338010 A1* | 11/2016 | Rico Alvarino ...... H04W 28/22 |
| 2018/0049129 A1* | 2/2018 | Li ..................... H04W 74/0816 |
| 2018/0103404 A1* | 4/2018 | Emmanuel ......... H04B 17/0085 |
| 2019/0007941 A1* | 1/2019 | Cavalcanti ............... H04L 5/14 |
| 2019/0037447 A1* | 1/2019 | Lee ..................... H04W 74/004 |
| 2019/0230630 A1* | 7/2019 | Mu .................. H04W 72/0466 |

* cited by examiner

SCHEDULING IN REPETITIVE RF ENVIRONMENTS

BACKGROUND

Technical Field

The present disclosure relates generally to communication systems, and more particularly, to a managing interference between a network and a device over RF communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Some user equipment (UE) devices, such as machine-type communication (MTC) or IoT devices, may provide for automated communication between machines (e.g., via Machine-to-Machine (M2M) communication). M2M communication or MTC may refer to data communication technologies that allow devices to communicate with one another or a base station without human intervention. Examples of M2M communication or MTC may include communications from devices that integrate sensors or meters to measure or capture information and relay that information to a central server or application program that can make use of the information or present the information to humans interacting with the program or application. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, factory automation, industrial manufacturing control, and transaction-based business charging.

SUMMARY

The following presents a simplified summary of one or more aspects in order to provide a basic understanding of such aspects. This summary is not an extensive overview of all contemplated aspects and is not intended to identify key or critical elements of all aspects, or delineate the scope of any or all aspects. Its sole purpose is to present some concepts of one or more aspects in a simplified form as a prelude to the more detailed description that is presented later.

Many environments or operational conditions create repetitive radio conditions (e.g., SNR, RSRP) resulting from repetitive mechanical or electrical activity. This activity may create oscillations in the RF conditions between an MTC UE and a serving base station. Aspects of the present invention are directed to improving data efficiency and battery life by optimizing communication based on the periodicity of repetitive mechanical or electrical activity at the UE by monitoring the oscillations of at least one radio condition between the MTC UE and the base station, and scheduling communication between the UE and the network during periods associated with favorable radio conditions.

In an aspect of the disclosure, a method, a computer-readable medium, and an apparatus are provided. The apparatus may be a base station. The apparatus may monitor for a repeating pattern associated with at least one radio condition between the base station and UE and schedule a transmission with the UE based on at least the repeating pattern associated with the at least one radio condition. The apparatus may then communicate the transmission between the base station and UE. The transmission may be either a downlink transmission or an uplink transmission. The at least one radio condition may correspond to a metric such as a path-loss measurement, SNR, RSRP, RSSI, multipath measurement, or any combination thereof. Additional criteria associated with scheduling the transmission may include device capability, a transmission size, a buffer status, a transmission priority, or a transmission latency requirement. The scheduling may also be based at least in part on a period of the repeating pattern and a transmission latency requirement associated with the transmission.

In certain aspects, the repeating pattern associated with the at least one radio condition may correspond to changes between low-quality signal measurements and high-quality signal measurements Furthermore, the apparatus may determine whether to schedule the transmission based on whether the at least one radio condition is within a threshold of a high-quality signal metric, which corresponds to the high-quality signal measurements. The threshold may also be at least partially based on at least one of a transmission priority or a transmission latency requirement.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
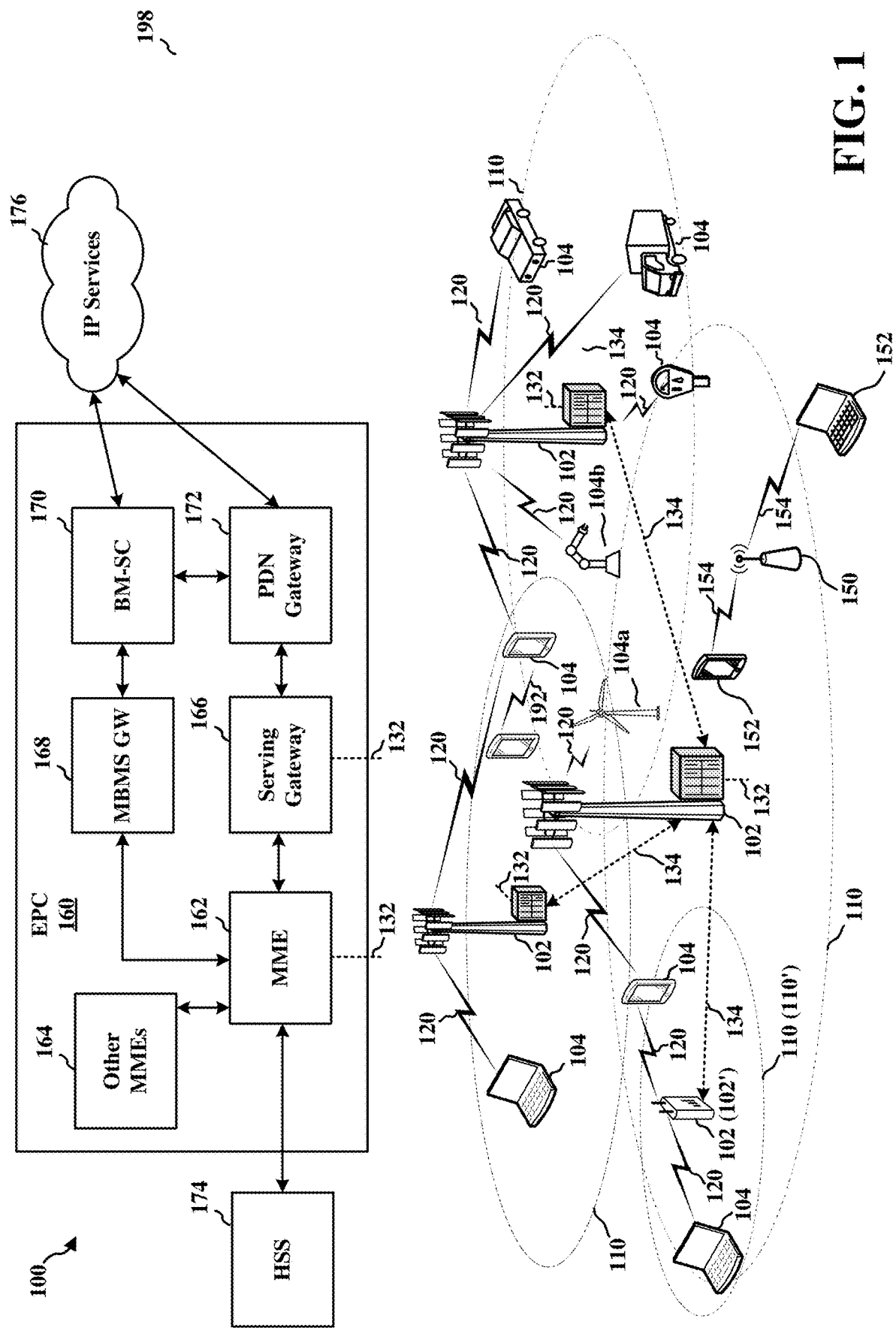
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 102 without human intervention. In some examples, M2M communication or MTC may include communications from devices that integrate sensors or meters to measure or capture information and relay that information to a central server or application program that can make use of the information or present the information to humans interacting with the program or application. Some UEs 104 may be designed to collect information or enable automated behavior of machines. Examples of applications for MTC devices include smart metering, inventory monitoring, water level monitoring, equipment monitoring, industrial manufacturing control, healthcare monitoring, wildlife monitoring, weather and geological event monitoring, fleet management and tracking, remote security sensing, physical access control, and transaction-based business charging. Specifically, IoT devices may generally include stationary devices that perform metering, monitoring, transactional, or industrial control services. Examples of IoT devices may include wind turbine 104a or an industrial robotics device 104b. The communication requirements for such devices may vary. For example, wind turbine 104a may report power generation and/or weather-related information at a periodicity of 1 hour to 1 day. Conversely, communications with industrial robot 104b may mandate constant tracking and network timing synchronization at a time frame on milliseconds or microseconds.

The operational activities of Iot devices, such as industrial IoT (IIoT) devices, create repetitive radio frequency (RF) interference conditions caused by repetitive mechanical or electrical activity. This activity may create oscillations in the RF conditions between an MTC UE and a serving base station. Aspects of the present invention are directed to improving data efficiency and battery life by optimizing communication based on a detected periodicity of repetitive mechanical or electrical activity at the UE by monitoring the oscillations of at least one RF condition between the MTC UE and the base station, and scheduling communication between the UE and the network during time periods associated with favorable radio conditions.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, wind turbines, industrial robotics, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
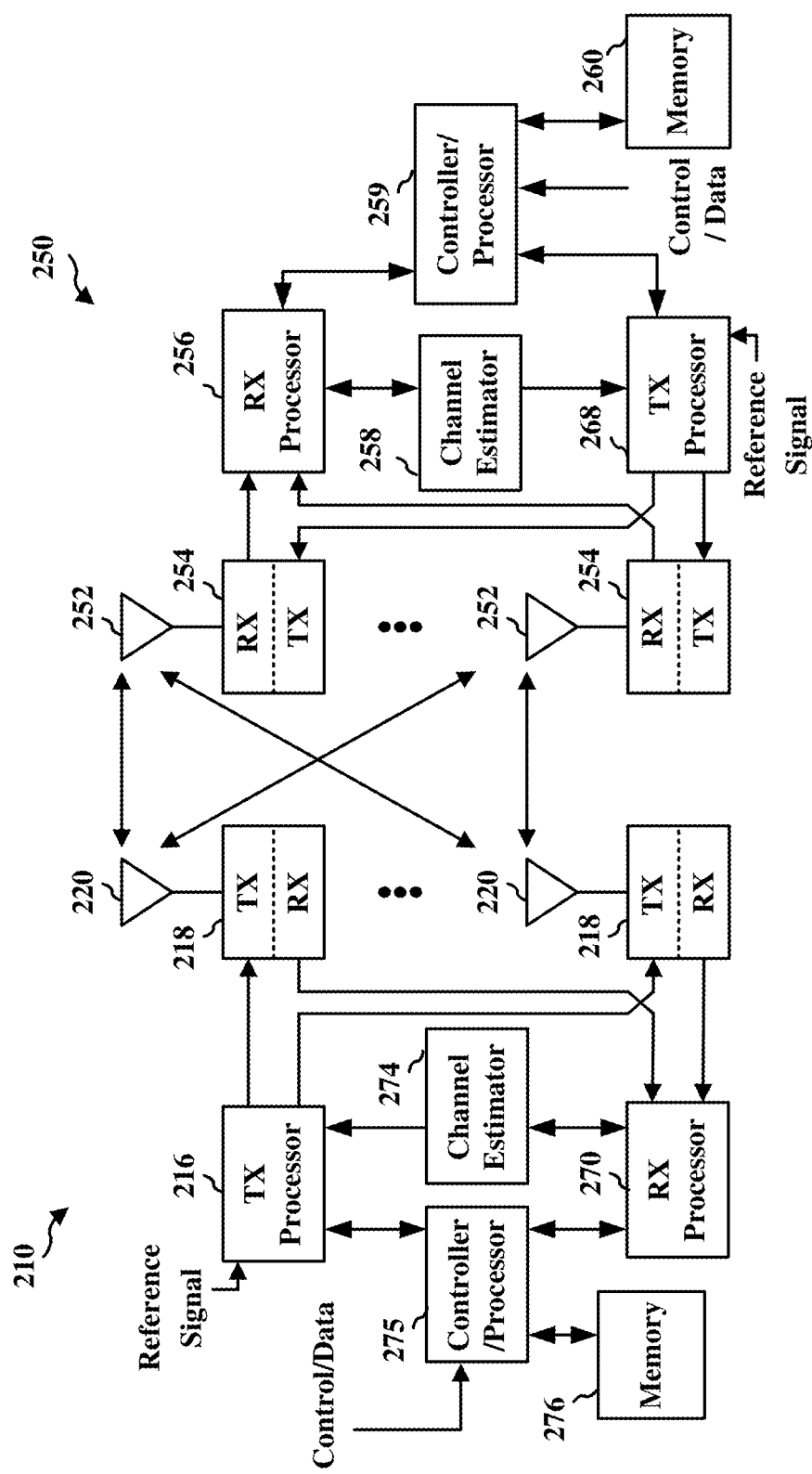
FIG. 2 is a diagram illustrating an example of a base station and UE in an access network.

FIG. 2 is a block diagram of a base station 210 in communication with a UE 250 in an access network. For example, the UE 250 may be a component of an MTC or IoT device that provides cellular connectivity for reporting sensor data and/or controlling an industrial device. In the DL, IP packets from the EPC 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), or M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 218TX. Each transmitter 318TX may modulate an RF carrier with a respective spatial stream for transmission.

At the UE 250, each receiver 354RX receives a signal through its respective antenna 252. Each receiver 254RX recovers information modulated onto an RF carrier and provides the information to the receive (RX) processor 356. The TX processor 368 and the RX processor 256 implement layer 1 functionality associated with various signal processing functions. The RX processor 256 may perform spatial processing on the information to recover any spatial streams destined for the UE 250. If multiple spatial streams are destined for the UE 350, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 360 that stores program codes and data. The memory 360 may be referred to as a computer-readable medium. In the UL, the controller/processor 259 provides demultiplexing between transport and logical channels, packet reassembly, deciphering, header decompression, and control signal processing to recover IP packets from the EPC 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission.

The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the EPC 160. The controller/processor 275 is also responsible for error detection using an ACK and/or NACK protocol to support HARQ operations.

Figure 3:
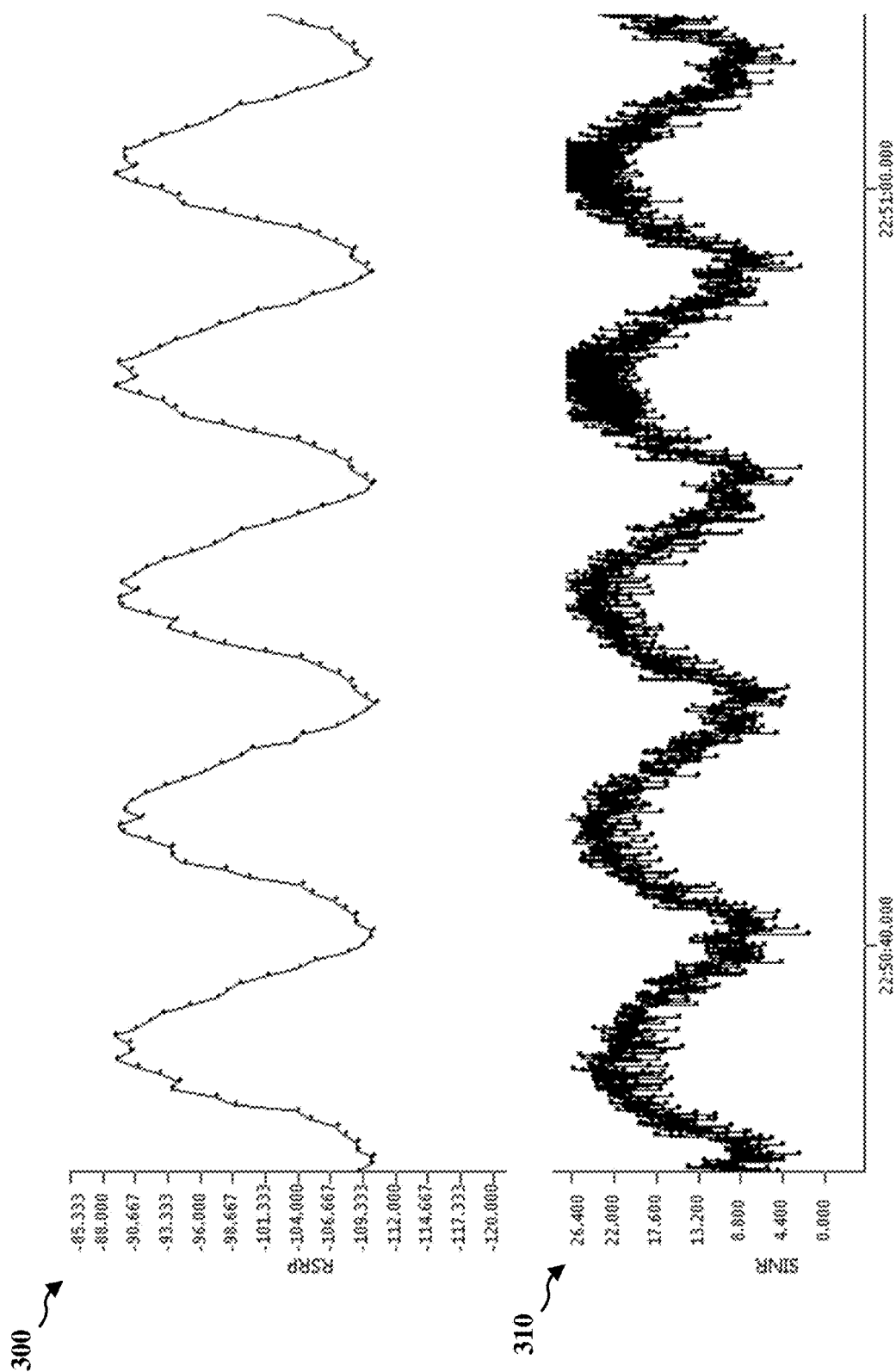
FIG. 3 illustrates a graph of signal strength associated with repetitive motion.

The operation of IoT devices, such as industrial IoT (IIoT) devices, creates repetitive radio frequency (RF) conditions caused by repetitive mechanical or electrical activity. For example, when industrial machines engage in repetitive motion, a modem housed in the moving component may experience significant, measurable variations in the signal-to-noise ratio (SNR) between the IoT device and a serving base station. Similarly, a modem housed near a component engaged in repetitive motion may experience significant, measurable variations in the SNR between the IoT device and the serving base station. Examples of such repetitive motion may include the motions of robotic equipment in an assembly line, or a spinning hub (i.e., propeller) of a wind turbine. In the wind turbine example, the rotation of the hub may create oscillations in the RF conditions between a modem in the turbine and the serving base station. FIG. 3 illustrates changes in SNR 300 and changes in reference signal receive power (RSRP) 310 that may be associated with such repetitive motion. Changes in SNR 300 are plotted in a range of 0 to 25 dB. SNR may oscillate based on the period of the motion. In extreme situations, this repeated variation in SNR may lead to coverage problems resulting in radio link failure (RLF). Similarly, changes in RSRP 310 are plotted in a range of −85 to −120 dBm. As a point of comparison, RSRP levels for usable signal typically range from about −75 dBm (close in to a cell site) to −120 dBm (at the cell edge). The changes in RSRP 310 illustrate the extent to which the obstruction from repetitive motion impacts signal quality.

Scheduling network resources for data transmission is typically done in opportunistic fashion. In the case of a single user, the data transmission is scheduled for the first transmission opportunity. When resources are shared among multiple UEs a scheduling algorithm can set a priority, based on multiple factors (for each UE and/or data stream), and then schedule the UEs with respective transmission opportunities in priority order.

In some scenarios, RF conditions follow a repeating pattern and thus waiting for a later transmission opportunity for some users and/or data streams might save network and/or UE resources. For example, in an industrial IoT setting where a modem is attached into or near equipment that is moving in a repetitive manner, RF conditions might be predictable, following repeating oscillations.

Aspects of the present invention are directed to improving data efficiency and battery life of devices experiencing such periodic interference by optimizing communication based on a detected periodicity of repetitive mechanical or electrical activity at the UE by monitoring the oscillations of at least one RF condition between the MTC UE and the base station, and scheduling communication between the UE and the network during time periods associated with favorable RF conditions. For example, as shown in FIG. 3 for the wind turbine example, SNR may repeatedly oscillate by over 20 dB during one hub rotation, with SNR peaking close to 25 dB and dropping to a low near 0 dB every cycle. This rotation time may vary from 3-7 seconds depending on the wind speed but does not change quickly. While FIG. 3 illustrates oscillations in SNR, similar behavior may be exploited with respect to path loss, RSRP, RSSI, multipath conditions, peak throughput, and other measurable conditions. A device or network can leverage the predictable behavior of the repetitive motion based one or more of these RF conditions to improve data transmission timing.

Figure 4:
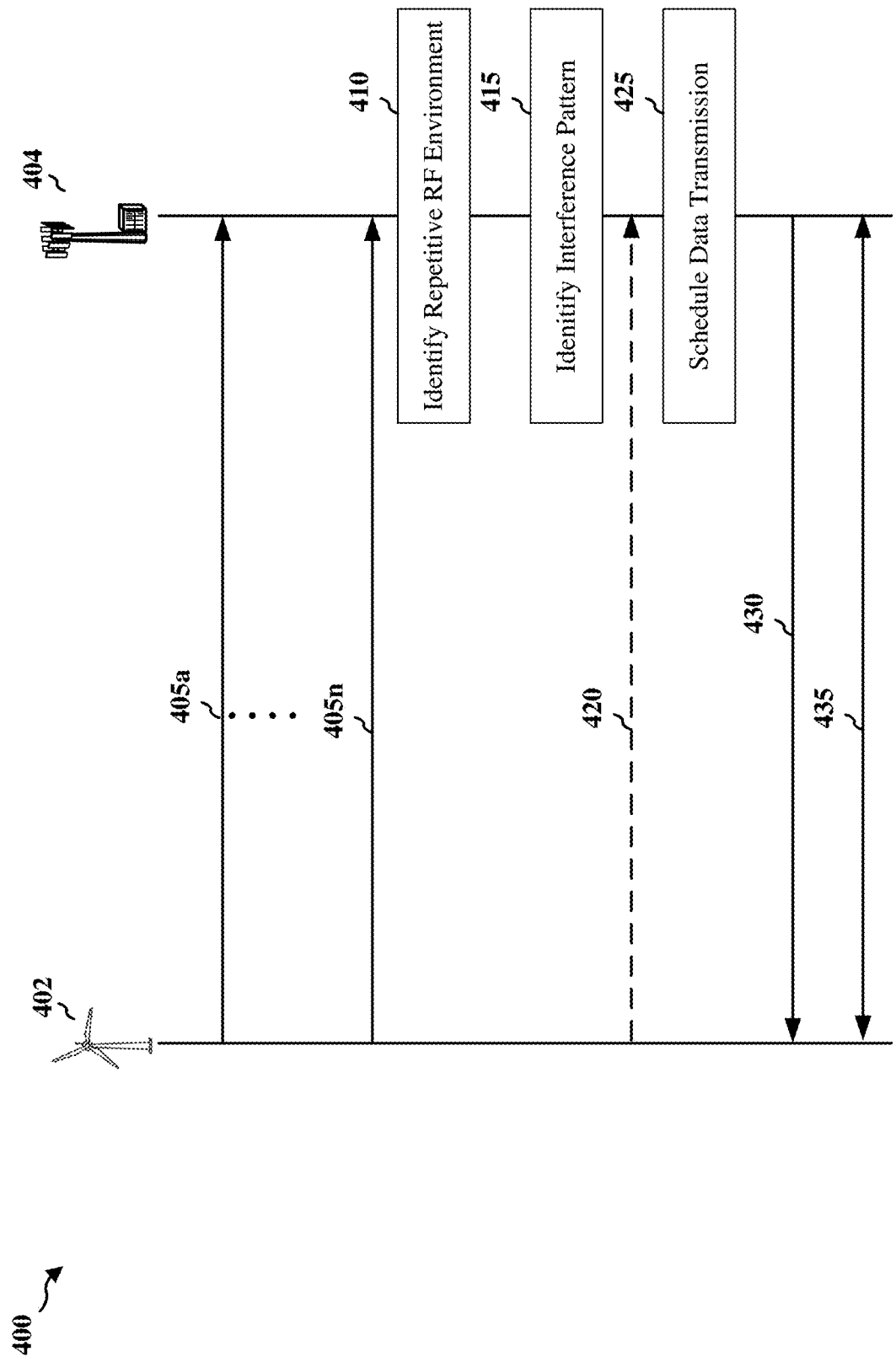
FIG. 4 illustrates a process diagram of communications between a UE and a base station in accordance with the present invention.

FIG. 4 illustrates a communication process between a UE 402 and base station 404 in accordance with the present invention. In FIG. 4, dashed lines represent optional activities. In this example, the UE 402 may be an IoT device, such as a wind turbine that is monitored via cellular communication. The turbine may include a cellular component in or adjacent to a metal housing, near the generator. This cellular component may serve to deliver operational sensor data from the turbine rotor to a cloud server (for maintenance and analysis). The wind turbine may rotate based on wind conditions, which in turn may place the hub (i.e., propeller) between the cellular component and the base station. The rotation of the hub may cause regular repetitive interference to the communication channels between the cellular component and the base station (similar to that shown in FIG. 3).

Initially, the RF environment at the UE 402 is assessed to determine whether it has an exploitable, predictable nature. This determination can be performed based on an analysis of the radio conditions between the UE 402 and base station 202 over a time period. Communications 405a to 405n provide the base station with channel measurements or signals by which the base station can detect channel conditions. For example, communication 405a to 405n may include reports (e.g., CSI reports) providing measurement of CRS, CSI-RS, PSS, SSS, PBCH, or other downlink signals measured by the UE 402. Additionally, or alternatively, communications 405a to 405a may include SRS transmitted by the UE 402 for measurement by the base station 404.

At 410, the base station 404 determines whether the RF environment is of a predictable nature. This determination can be based on communication 405A to 405n, and/or traffic patterns associated with UE 402, by evaluating the recent history of an RF condition.

At 415, the base station 404 may determine the traffic pattern corresponding to the periodic nature of the channel. In one example, the network or base station 404 may attempt to anticipate a repeating RF condition. If the RF condition follows a cyclic pattern and the cycle time between favorable RF condition occasions is shorter than the latency requirement of a data flow, scheduling for a data flow can be delayed or adjusted to coincide with a favorable RF condition.

Favorable RF conditions differ based on the device capabilities, amount of data, type of data, etc. For example, low path loss and/or high SNR could minimize power consumption, whereas rich multipath conditions improve peak throughput. Sending data in optimal RF conditions can save resources (e.g., battery power or network capacity). The definition of favorable radio conditions may differ based on the requirement of a given scenario. For example, in an industrial equipment scenario, low latency and precise timing may be a priority, thus high SNR could be a primary aspect of defining favorable RF conditions. Conversely, devices that transmit large amounts of data infrequently, may benefit from rich multipath environments that support higher data transmission rates.

At 420, the base station 404 receives a scheduling request (SR) or a buffer status report (BSR) from the UE 402. In certain aspects, the base station 404 may not require a request from UE 402, and instead may be configured to schedule the UE 402 at pre-determined intervals to provide uplink opportunities for data upload. In other aspect, the base station 404 may schedule a downlink transmission from the base station 404 to UE 402.

At 425, the base station 404 may schedule data for transmission. This may include employing a scheduling algorithm that determines a transmission time based on the traffic pattern. The base station 404 may also schedule of the transmission based on a device capability, a transmission size, a buffer status, a transmission priority, or a transmission latency requirement. For example, the base station 404 may schedule the data transmission based at least in part on a period of the repeating pattern and a transmission latency requirement of the uplink data at UE 402 or pending downlink data from the base station 404.

At 430, the base station 404 transmits an uplink grant to the UE 402 to transmit uplink data. Alternatively, the base station 404 may transmit an downlink assignment to the UE 402 to transmit downlink data. If a cyclic pattern of the RF condition is shorter than the latency requirement of the data, the transmission of the uplink grant or downlink assignment may be delayed or adjusted to coincide with a favorable RF condition. If the cyclic pattern of the RF condition is longer than the latency requirement of the data and the next peak in favorable RF condition exceeds a latency requirement of the data, the transmission of the uplink grant or downlink assignment may be sent immediately.

At 435, the UE 402 transmits the data between the UE 402 and the base station 404.

In alternative embodiments, the base station 404 may not determine a pattern of RF conditions, but may instead monitor for high-quality RF conditions and low-quality RF conditions. For example, the base station may maintain a moving average of high SNR and low SNR measurements. Then, the base station 404 may determine whether to transmit an uplink grant or downlink assignment based on a current SNR, average high SNR measurement, average low SNR measurement, the latency requirements of the data associated with UE 402, and a static or dynamic time threshold or SNR threshold.

Figure 5:
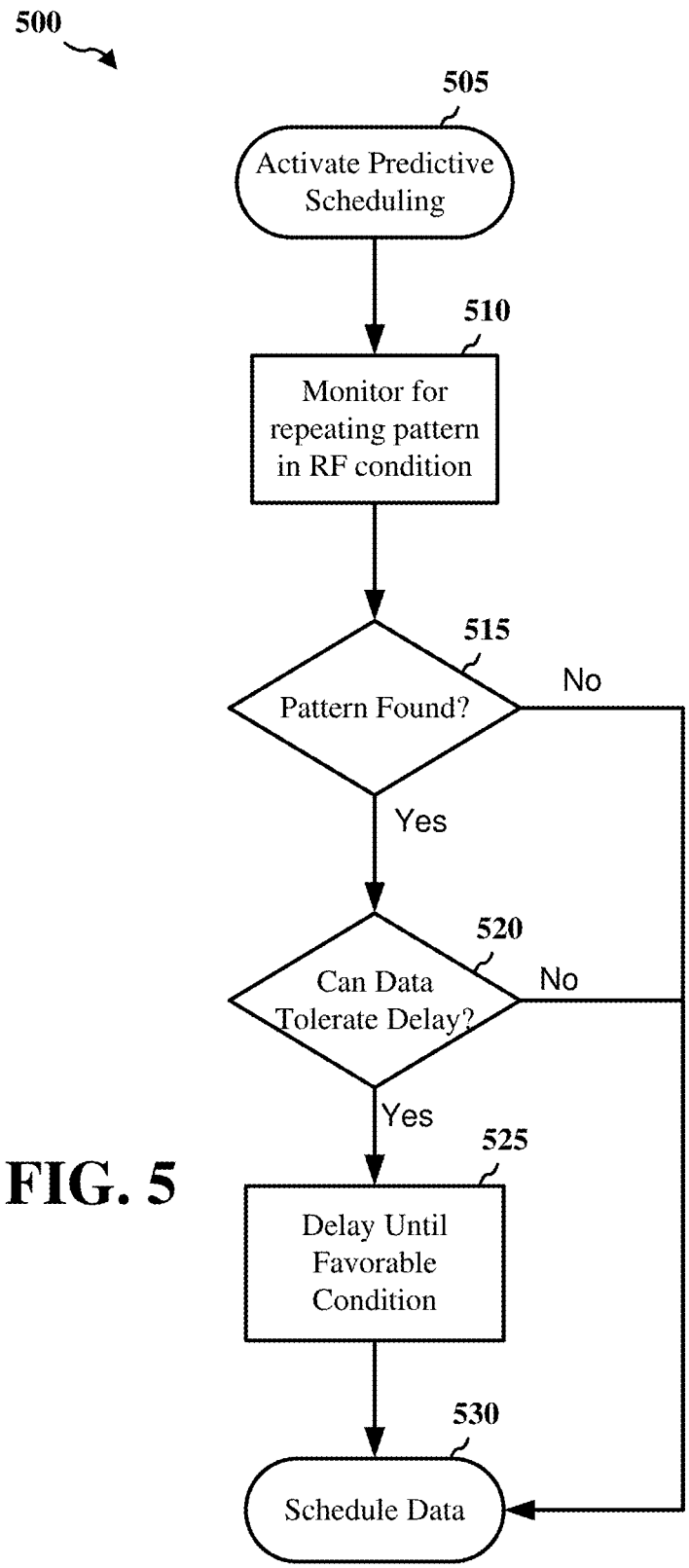
FIG. 5 illustrates a flow diagram of a process to optimize transmission experiencing cyclic RF conditions.

FIG. 5 illustrates a flow diagram 500 of a process to optimize transmission in cyclic RF conditions. The device may be a base station (e.g., base station 404) in communication with a UE (e.g., UE 402). The base station may also be in communication with one or more IoT UEs in an environment with a repetitive RF condition.

At 505, the device may activate predictive scheduling. The base station may have already determined that the RF environment may include a cyclic radio condition. Alternatively, the base station may be configured to activate predictive scheduling when it is configured as part of a system from monitoring IoT or MTC devices known to cause repetitive interference.

At 510, the device may monitor for a repeating pattern associated with the RF condition. The device may monitor channel reports and/or reference signals from the UE to identify cyclic RF patterns. The UE reports (e.g., CSI reports) may include indications of measured signal strength for reference signals (e.g. CRS, CSI-RS, PSS, SSS, PBCH, or other downlink signals) measured by the UE. Additionally, or alternatively, the device may monitor SRS transmitted by the UE.

At 515, the device may determine if the RF condition follows a repeating pattern. If the RF condition follows a pattern, then the process continues to step 520. If there is no detectable pattern to the RF condition, then, at 530, data is scheduled for transmission. The device may determine whether a pattern exists by applying a machine learning algorithm to the reference signal measurement (and reports) to identify a pattern in the variations of the RF conditions. Alternatively, or additionally, the device may employ a conventional time series analysis (e.g., peak-detection or wave-detection algorithm).

For example, the device may employ network side logs (e.g., post-processed SNR measurements) to generate a time series mapping of the RF condition (e.g., time series RSRP). In the wind turbine example, the RF condition may follow a pattern that maps to the hub rotation.

At 520, the device may determine the transmission latency requirement of the data for transmission. Specifically, the device might compare the latency requirement of the data to the period of the cyclic pattern of the RF condition. If a cyclic pattern of the RF condition is shorter than the latency requirement of the data, the transmission of the uplink grant or downlink assignment may be delayed or adjusted to time the corresponding data transmission with a favorable RF condition, at 525. If the cyclic pattern of the RF condition is longer than the latency requirement of the data and the next peak in favorable RF condition exceeds the latency requirement of the data, the uplink grant or downlink assignment may be sent immediately at 530. Under different conditions, the latency requirement can be very long, where data only needs to be sent once an hour up to one per 24 hours (e.g., weather monitoring). Conversely, it might be critical for data to arrive quickly (i.e., to stop a machine due to errors).

After determining that the RF condition has a repeating pattern and the transmission latency requirement of the data for transmission is shorter that the cycle of the RF condition, at 525, the device may delay data transmission to coincide with favorable RF conditions. If the device is a base station, this may include a delay in scheduling the data transmission.

At 530, the device may schedule data for transmission. This may include transmission of an uplink grant or downlink assignment.

Figure 6:
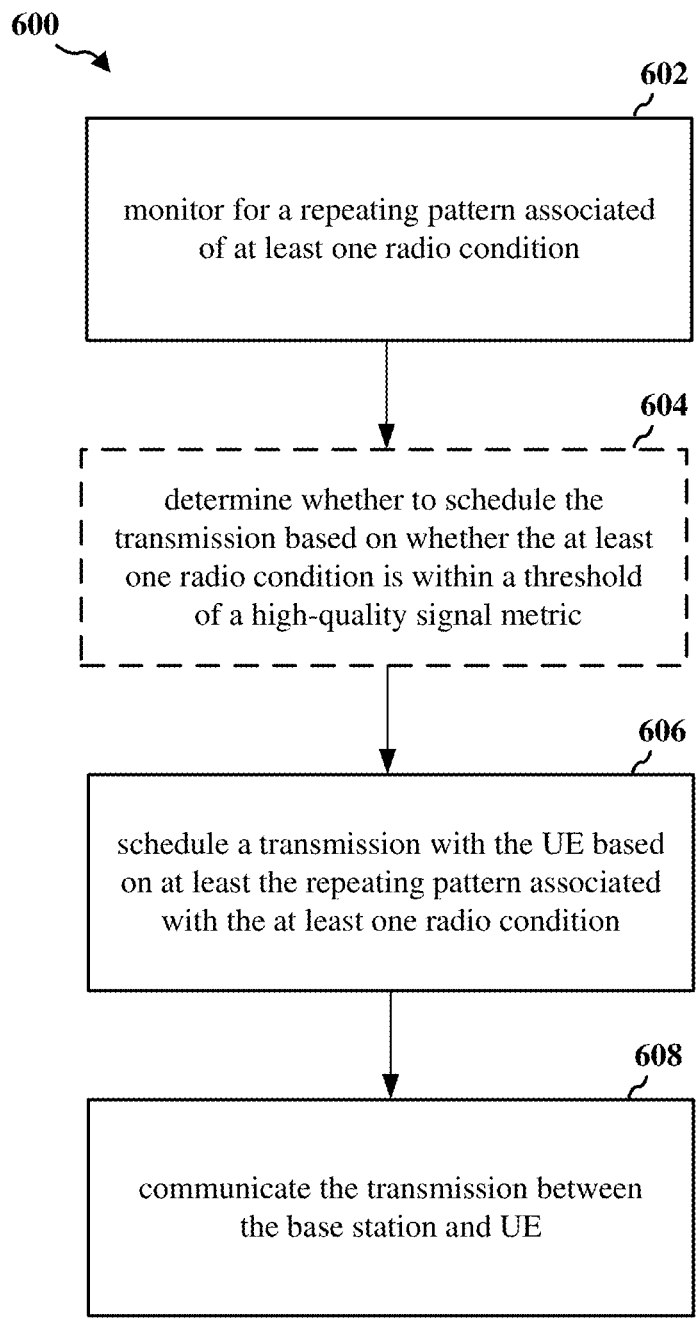
FIG. 6 is a flowchart of a method of wireless communication.

FIG. 6 is a flowchart 600 of a method of wireless communication. The method may be performed by a base station (e.g., the base station 404, the apparatus 702/702').

At 602, the base station monitors for a repeating pattern associated with at least one radio condition. The repeating pattern may be associated with changes or oscillations in a radio condition corresponding to low-quality signal measurements and high-quality signal measurements.

At 604, the base station determines whether to schedule the transmission based on whether the at least one radio condition is within a threshold of a high-quality signal metric. The radio condition may correspond to a metric comprising a measurement of path-loss, SNR, RSRP, RSSI, or multipath quality or throughput. For example, the base station may determine to schedule the transmission if a current RF condition is within a threshold of a high-quality signal metric, the high-quality signal metric corresponding to the favorable RF condition. The threshold may be at least partially determined based on a transmission priority or a transmission latency requirement. The threshold may be a time threshold (e.g., a high-quality RF condition is expected to repeat within a time threshold) or a quality threshold (e.g., the current signal quality is within a threshold of an expected high-quality RF condition).

At 606, the base station schedules a transmission with the UE based on at least the repeating pattern associated with the at least one radio condition. The base station may also base the scheduling of the transmission on a device capability, a transmission size, a buffer status, a transmission priority, or a transmission latency requirement. For example, the base station may schedule the data transmission based at least in part on a period of the repeating pattern and a transmission latency requirement of the data.

Finally, at 608, the transmission is communicated between the base station and UE. The communication may be an uplink transmission or a downlink transmission.

Figure 7:
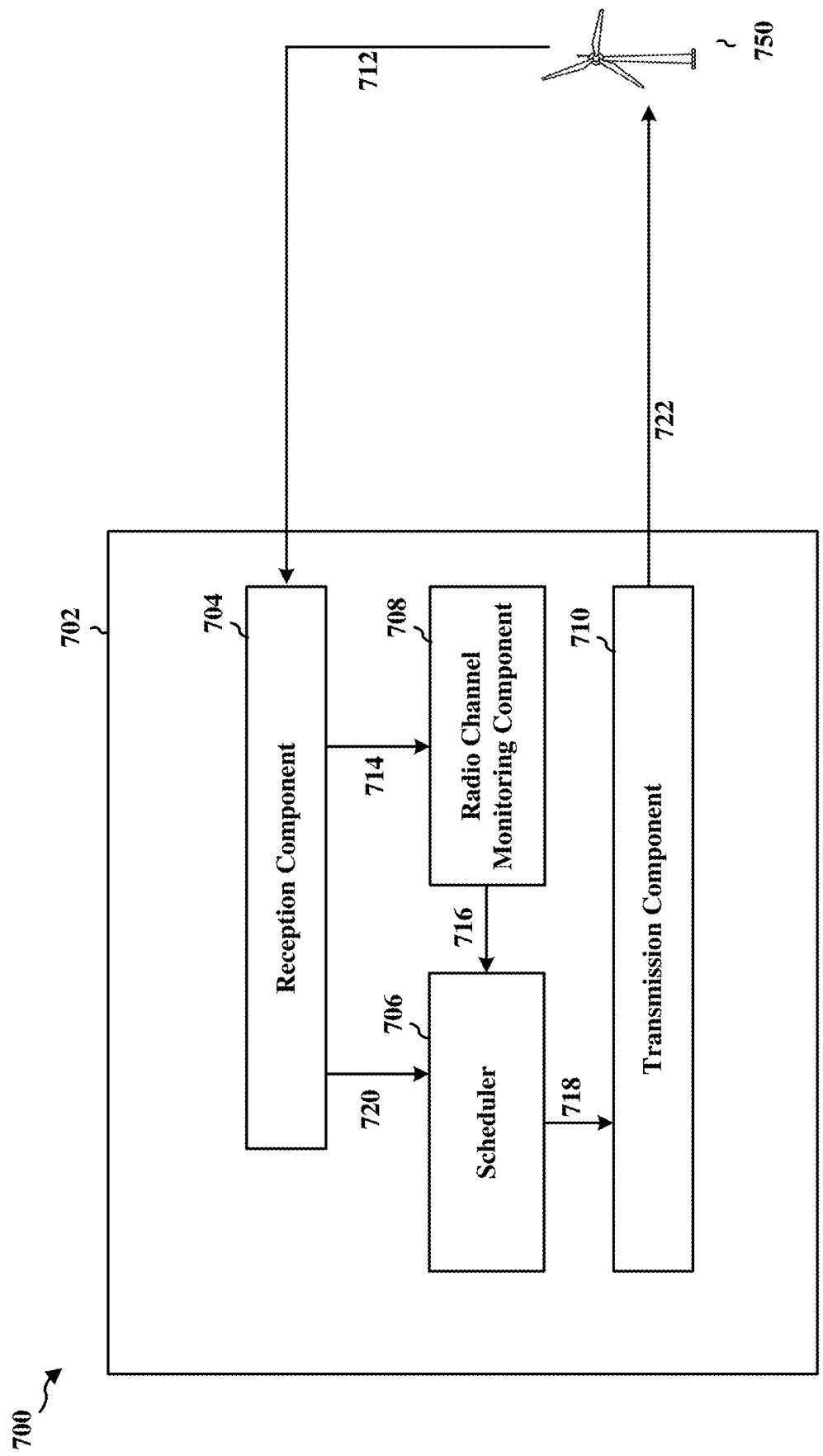
FIG. 7 is a conceptual data flow diagram illustrating the data flow between different means/components in an exemplary apparatus.

FIG. 7 is a conceptual data flow diagram 700 illustrating the data flow between different means/components in an exemplary apparatus 702. The apparatus may be a base station. The apparatus includes a reception component 704, a scheduler 706, a radio channel monitoring component 708, and a transmission component 710. Reception component 704 receives uplink transmissions 712 from a UE 750. Uplink transmissions 712 may include data transmission from UE 750 containing MTC communications and sensor data, reference signals, and measurement reports from UE 750. Uplink transmissions 712 may also include scheduling requests or buffer status reports 720 used to trigger uplink grants. Radio channel monitoring component 706 monitors for repetitive RF conditions based on reference signals and measurement reports 714 from UE 750. Based on the reference signals and measurement reports 714 from UE 750, radio channel monitoring component 706 may determine if a repetitive radio condition exists between base station 702 and UE 750 and provides timing information 716 to scheduler 706. Scheduler 706 schedules 718 downlink transmissions 722 to the UE 750 and uplink transmissions 712 from the UE 750. Scheduler 706 receives scheduling requests or buffer status reports 714 from UE 750 and timing information 716 from radio channel monitoring component 706. Scheduler 706 may schedule transmissions between base station 702 and UE 750 based on the timing information and latency requirements associated with the transmissions. Transmission component 708 transmits downlink communications to UE 750. These downlink communications may include control information (e.g., downlink assignment, uplink grant) or data for UE 750.

The apparatus may include additional components that perform each of the blocks of the algorithm in the aforementioned flowcharts of FIGS. 5-6. As such, each block in the aforementioned flowcharts of FIGS. 5 and 6 may be performed by a component and the apparatus may include these components. The components may be one or more hardware components specifically configured to carry out the stated processes/algorithms, implemented by a processor configured to perform the stated processes/algorithms, stored within a computer-readable medium for implementation by a processor, or some combination thereof.

Figure 8:
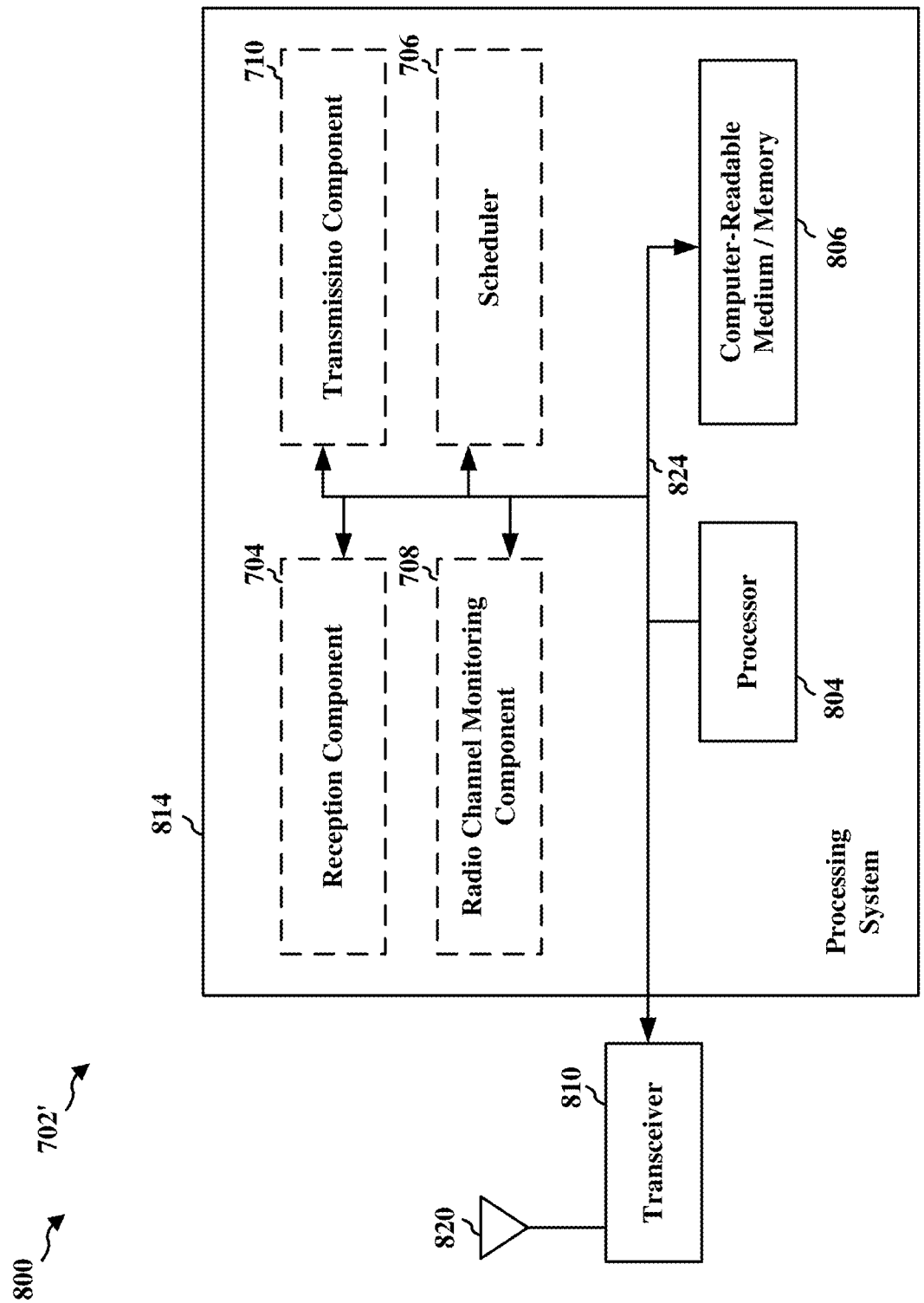
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, components 704, 706, 708, 710 and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 710, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, and 710. The components may be software components running in the processor 804, resident/stored in the computer readable medium/memory 806, one or more hardware components coupled to the processor 804, or some combination thereof. The processing system 814 may be a component of the base station 210 and may include the memory 276 and/or at least one of the TX processor 216, the RX processor 270, and the controller/processor 275.

In one configuration, the apparatus 702/702' for wireless communication includes means for monitoring for a repeating pattern associated with at least one radio condition between the base station and UE, means for scheduling a transmission with the UE based on at least the repeating pattern associated with the at least one radio condition, means for communicating the transmission between the base station and UE. and means for determining whether to schedule the transmission based on whether the at least one radio condition is within a threshold of a high-quality signal metric, the high-quality signal metric corresponding to the high-quality signal measurements. The aforementioned means may be one or more of the aforementioned components of the apparatus 702 and/or the processing system 814 of the apparatus 702' configured to perform the functions recited by the aforementioned means. As described supra, the processing system 814 may include the TX Processor 216, the RX Processor 270, and the controller/processor 275. As such, in one configuration, the aforementioned means may be the TX Processor 216, the RX Processor 270, and the controller/processor 275 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of communication at a base station, comprising:

monitoring for a repeating pattern associated with at least one radio condition on a radio channel between the base station and a UE;
determining if a cycle time between low interference radio condition occasions is shorter than a latency requirement of data for transmission;
scheduling the data for transmission on the radio channel with the UE based on at least the repeating pattern associated with the at least one radio condition if the cycle time between low interference radio condition occasions is shorter than the latency requirement of the data for transmission; and
communicating the data in a transmission between the base station and the UE.

2. The method of claim 1, wherein the transmission is a downlink transmission.

3. The method of claim 1, wherein the transmission is an uplink transmission.

4. The method of claim 1, wherein the at least one radio condition corresponds to a metric comprising at least one of a path-loss measurement, a SNR, a RSRP, a RSSI, and a multipath measurement.

5. The method of claim 1, wherein scheduling the data for transmission is further based on at least one criterion, the at least one criterion including at least one of a device capability, a transmission size, a buffer status, a transmission priority, or a transmission latency requirement.

6. The method of claim 1, wherein the repeating pattern associated with the at least one radio condition corresponds to changes between low-quality signal measurements and high-quality signal measurements.

7. The method of claim 1, wherein the scheduling is based at least in part on a period of the repeating pattern and a transmission latency requirement.

8. The method of claim 1, further comprising determining whether to schedule the data for transmission based on whether the at least one radio condition is within a threshold of a high-quality signal metric, the high-quality signal metric corresponding to the high-quality signal measurements.

9. The method of claim 8, wherein the threshold is at least partially based on at least one of a transmission priority or a transmission latency requirement.

10. The method of claim 1, wherein the scheduling comprises delaying or adjusting a transmission if the data flow can be delayed or adjusted to coincide with a favorable instance of the radio condition based on whether the cycle time between the low interference radio conditions occasions is shorter than the latency requirement of the data for transmission.

11. The method of claim 1, further comprising receiving, from the UE, a request to schedule the data for transmission, wherein the request comprises one of a scheduling request or a buffer status report.

12. A base station, comprising:
a memory; and
at least one processor coupled to the memory and configured to:
monitor for a repeating pattern associated with at least one radio condition on a radio channel between the base station and a UE;
determining if a cycle time between low interference radio condition occasions is shorter than a latency requirement of data for transmission;
schedule the data for transmission on the radio channel with the UE based on at least the repeating pattern associated with the at least one radio condition if the cycle time between low interference radio condition occasions is shorter than the latency requirement of the data for transmission; and
communicate the data in a transmission between the base station and the UE.

13. The apparatus of claim 12, wherein the transmission is a downlink transmission.

14. The apparatus of claim 12, wherein the transmission is an uplink transmission.

15. The apparatus of claim 12, wherein the at least one radio condition corresponds to a metric comprising at least one of a path-loss measurement, a SNR, a RSRP, a RSSI, and a multipath measurement.

16. The apparatus of claim 12, wherein at least one processor is further configured to schedule the data for transmission based on at least one criterion, the at least one criterion including at least one of a device capability, a transmission size, a buffer status, a transmission priority, or a transmission latency requirement.

17. The apparatus of claim 12, wherein the repeating pattern associated with the at least one radio condition corresponds to changes between low-quality signal measurements and high-quality signal measurements.

18. The apparatus of claim 12, wherein the scheduling is based at least in part on a period of the repeating pattern and a transmission latency requirement.

19. The apparatus of claim 12, wherein at least one processor is further configured to determine whether to schedule the data for transmission based on whether the at least one radio condition is within a threshold of a high-quality signal metric, the high-quality signal metric corresponding to the high-quality signal measurements.

20. The apparatus of claim 19, wherein the threshold is at least partially based on at least one of a transmission priority or a transmission latency requirement.

21. A base station, comprising:
means for monitoring for a repeating pattern associated with at least one radio condition on a radio channel between the base station and the UE;
means for determining if a cycle time between low interference radio condition occasions is shorter than a latency requirement of data for transmission;
means for scheduling the data for transmission on the radio channel with the UE based on at least the repeating pattern associated with the at least one radio condition; and
means for communicating the data in a transmission between the base station and the UE.

22. The apparatus of claim 21, wherein the transmission is a downlink transmission.

23. The apparatus of claim 21, wherein the transmission is an uplink transmission.

24. The apparatus of claim 21, wherein the at least one radio condition corresponds to a metric comprising at least one of a path-loss measurement, a SNR, a RSRP, a RSSI, and a multipath measurement.

25. The apparatus of claim 21, wherein means scheduling the transmission further schedules the data for transmission based on at least one criterion, the at least one criterion including at least one of a device capability, a transmission size, a buffer status, a transmission priority, or a transmission latency requirement.

26. The apparatus of claim 21, wherein the repeating pattern associated with the at least one radio condition corresponds to changes between low-quality signal measurements and high-quality signal measurements.

27. The apparatus of claim 21, wherein the scheduling is based at least in part on a period of the repeating pattern and a transmission latency requirement.

28. The apparatus of claim 21, further comprising means for determining whether to schedule the data for transmission based on whether the at least one radio condition is within a threshold of a high-quality signal metric, the high-quality signal metric corresponding to the high-quality signal measurements.

29. The apparatus of claim 28, wherein the threshold is at least partially based on at least one of a transmission priority or a transmission latency requirement.

30. A non-transitory computer-readable medium storing computer executable code, comprising code to:
    monitor for a repeating pattern associated with at least one radio condition on a radio channel between a base station and a UE;
    determine if a cycle time between low interference radio condition occasions is shorter than a latency requirement of data for transmission;
    schedule the data for transmission on the radio channel with the UE based on at least the repeating pattern associated with the at least one radio condition if the cycle time between low interference radio condition occasions is shorter than the latency requirement of the data for transmission; and
    communicate the data in a transmission between the base station and the UE.

31. The non-transitory computer-readable medium of claim 30, wherein scheduling the data for transmission is further based on at least one criterion, the at least one criterion including at least one of a device capability, a transmission size, a buffer status, a transmission priority, or a transmission latency requirement.

32. The non-transitory computer-readable medium of claim 30, further comprising code to determine whether to schedule the data for transmission based on whether the at least one radio condition is within a threshold of a high-quality signal metric, the high-quality signal metric corresponding to the high-quality signal measurements.

* * * * *